United States Patent [19]

Mitsumatsu et al.

[11] Patent Number: 4,465,900
[45] Date of Patent: Aug. 14, 1984

[54] HIGH VOLTAGE GLAZED PORCELAIN INSULATORS

[75] Inventors: Yoshio Mitsumatsu, Chita; Shoji Seike, Nagoya, both of Japan

[73] Assignee: NGK Insulators, Ltd., Nagoya, Japan

[21] Appl. No.: 487,029

[22] Filed: Apr. 21, 1983

[30] Foreign Application Priority Data

Mar. 16, 1983 [JP] Japan ............................... 58-42418

[51] Int. Cl.³ ....................... H01B 17/60; H01B 3/12
[52] U.S. Cl. .................................. 174/209; 174/140 C
[58] Field of Search .......... 174/137 A, 140 R, 140 C, 174/141 C, 209

[56] References Cited

U.S. PATENT DOCUMENTS

| | | | |
|---|---|---|---|
| 2,157,100 | 5/1939 | Rowland | 174/209 |
| 3,658,583 | 4/1972 | Ogawa et al. | 174/140 C X |
| 3,729,575 | 4/1973 | Harding et al. | 174/140 C X |
| 3,876,455 | 4/1975 | Higuchi et al. | 174/209 X |

OTHER PUBLICATIONS

Valeyev, Kh. S., et al., "The Variation of the Electrical Strength of High Voltage Porcelain Under Sustained High Direct Voltage", *Elektrichestvo*, No. 1, pp. 59–61, 1963.
Budnikov, P. P., et al., "The Effect of Vitreous Phase on the Properties of High-Tension Electrical Porcelain", Xth International Ceramic Congress in Stockholm, Sweden, Jun. 12–18, 1966.

*Primary Examiner*—Laramie E. Askin
*Attorney, Agent, or Firm*—Parkhurst & Oliff

[57] ABSTRACT

High voltage porcelain insulator comprises, a porcelain body, and a glaze applied on at least a surface of the porcelain body, said porcelain body having a specific resistivity $\rho_p$ of $\rho_p \geq 5.0 \times 10^{13}$ Ω.cm, and said glaze having a specific resistivity $\rho_g$ of $\rho_g < \rho_p$.

4 Claims, 4 Drawing Figures

FIG_2

HIGH VOLTAGE GLAZED PORCELAIN INSULATORS

BACKGROUND OF THE INVENTION

1. Field of the Invention

The present invention relates to a high voltage porcelain insulator. More particularly, the present invention relates to a high voltage porcelain insulator which is suitably used for direct current (DC) high voltage use but which is also available to alternating current (AC) high voltage use.

2. Description of the Prior Art

Heretofore, high voltage porcelain insulators have been used for electric precipitators or electric power systems, when they are used for DC high voltage line. However, they are liable to deteriorate at their porcelain portions, especially when they are used at high electrical field concentration or at high temperatures.

As porcelain materials porcelains of DC insulators for use at high temperatures, hitherto, use has been made of porcelains which have high specific resistivity, superior thermal shock property and low thermal expansion coefficient.

As various studies on deterioration properties of porcelains due to energization of DC voltage, there are such reports as Kh. S. Valeyev et al "The Variation of the Electrical Strength of High Voltage Porcelain under Sustained High Direct Voltage" Elektrichestvo, No. 1, pp. 59-61 (1963) and P. P. Budnikov et al "The Effect of Vitreous Phase on the Properties of High-Tension Electrical Porcelain" Xth International Ceramic Congress in Stockholm, Sweden, June 12-18, 1966. In these reports, deterioration properties of material porcelains of various compositions due to energization of DC voltage have been evaluated by using test piece specimens of the porcelains and it is concluded that specific resistivity of porcelains should preferably be made high in order to decrease the deterioration phenomena of the porcelains due to energization of DC voltage. The conclusion has been explained by the reason that when a porcelain is applied with DC high voltage at high temperatures, ionic current is produced in the porcelain and a layer of high specific resistivity which contains a decreased amount of alkali metal component is formed at the positive electrode of the porcelain and a deposit of alkali metal is formed at the negative electrode of the porcelain and hence mechanical properties and electrical properties of the porcelain are deteriorated.

According to results of tests on test pieces which the inventors had performed for evaluating the deterioration property of porcelains under energization of DC voltage, a tendency of a porcelain has been confirmed that rate of decrease of dielectric breakdown voltage becomes low as specific resistivity of the porcelain becomes high as shown in the attached FIG. 1, similarly as in the results of the tests of the above known publications. This is presumably due to a reason that, under a certain condition of energization of DC voltage, a porcelain of a high specific resistivity allows small electric current to flow and hence has smaller effect in varying the material porcelain.

Though there have been conducted studies on deterioration of porcelains due to energization of DC voltage using test piece specimens as mentioned above, there are very few studies on deterioration properties of porcelain insulators due to energization of DC voltage, which were produced by assembling porcelains and hardwares with the aid of cement and the like. Therefore, the mechanism of deterioration of the porcelain insulators due to energization of DC voltage has not yet been clarified.

SUMMARY OF THE INVENTION

An object of the present invention is to obviate the aforementioned drawbacks of conventional high voltage porcelain insulators.

Another object of the present invention is to provide a high voltage porcelain insulator which has high reliability and less deterioration even after long-range service under sustained DC high voltage.

The further object of the present invention is to provide a high voltage porcelain insulator, comprising a porcelain body, and a glaze applied on at least a surface of the porcelain body, said porcelain body having a specific resistivity $\rho_p$ of $\rho_p \geq 5.0 \times 10^{13}$ $\Omega \cdot cm$, and said glaze having a specific resistivity $\rho_g$ of $\rho_g < \rho_p$.

Still further object of the present invention is to provide a high voltage porcelain insulator, comprising a porcelain body, and a glaze applied on at least a surface of the porcelain body, the porcelain body having a specific resistivity $\rho_p$ of $1.0 \times 10^{14}$ $\Omega \cdot cm \leq \rho_p \leq 1.0 \times 10^{16}$ $\Omega \cdot cm$, and the glaze having a specific resistivity $\rho_g$ of $5.0 \times 10^{12}$ $\Omega \cdot cm \leq \rho_g \leq 5.0 \times 10^{14}$ $\Omega \cdot cm$ and $\rho_g < \rho_p$.

Another object of the present invention is to provide also a high voltage porcelain insulator, comprising a porcelain body, and a glaze applied on at least a surface of the porcelain body, the porcelain body having a specific resistivity $\rho_p$ of $\rho_p \geq 5.0 \times 10^{13}$ $\Omega \cdot cm$, and the glaze having a specific resistivity $\rho_g$ of $\rho_g \geq 1 \times 10^{13}$ $\Omega \cdot cm$ and $\rho_g < 0.8 \rho_p$.

Another object of the present invention is to provide a high voltage porcelain insulator, comprising a porcelain body and a glaze applied on at least a surface of the porcelain body, the porcelain body having a specific resistivity $\rho_p$ of $1.0 \times 10^{14}$ $\Omega \cdot cm \leq \rho_p \leq 1.0 \times 10^{16}$ $\Omega \cdot cm$, and the glaze having a specific resistivity $\rho_g$ of $\rho_g \geq 1 \times 10^{13}$ $\Omega \cdot cm$ and $\rho_g < 0.8 \rho_p$.

Figure 1:
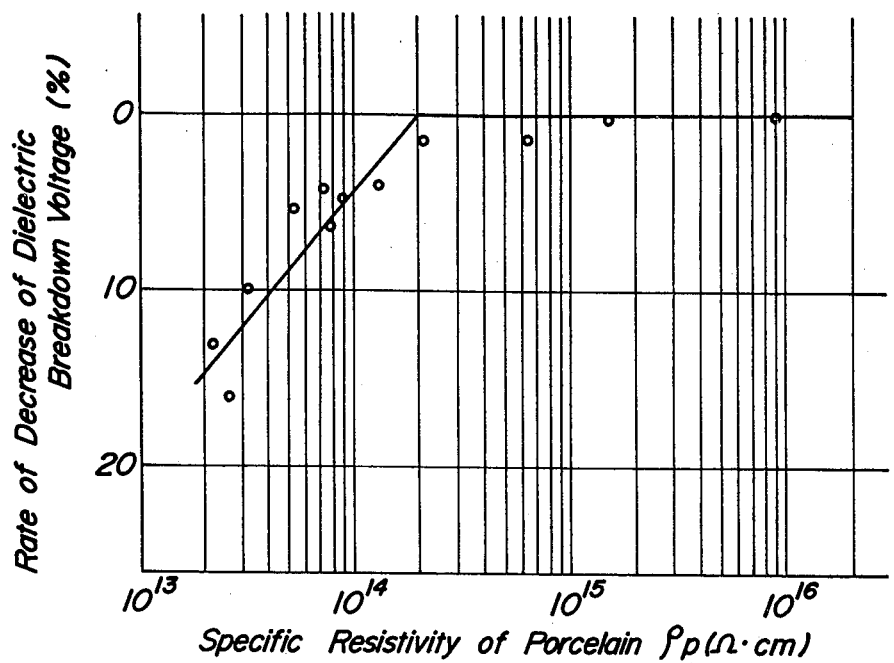
FIG. 1 is a characteristic graph of deterioration property of porcelain insulators due to energization of DC voltage showing rate of decrease in % of dielectric breakdown voltage in relation to specific resistivity $\rho_p$ of porcelains.

In the drawings, numberings of referential numerals are as follows.

1 . . . porcelain body, 2 . . . glaze, 2a . . . portion of glaze which contacts with cement 3a, 2b . . . externally exposed portion of glaze, 2c . . . portion of glaze which contacts with another cement 3b, 3 . . . cement, 3a . . . cement portion, 3b . . . another cement portion, 4 . . . hardware, 4a . . . hardware which forms positive electrode, 4b . . . hardware which forms negative electrode, 5 . . . cork.

DESCRIPTION OF THE PREFERRED EMBODIMENTS

Figure 3:
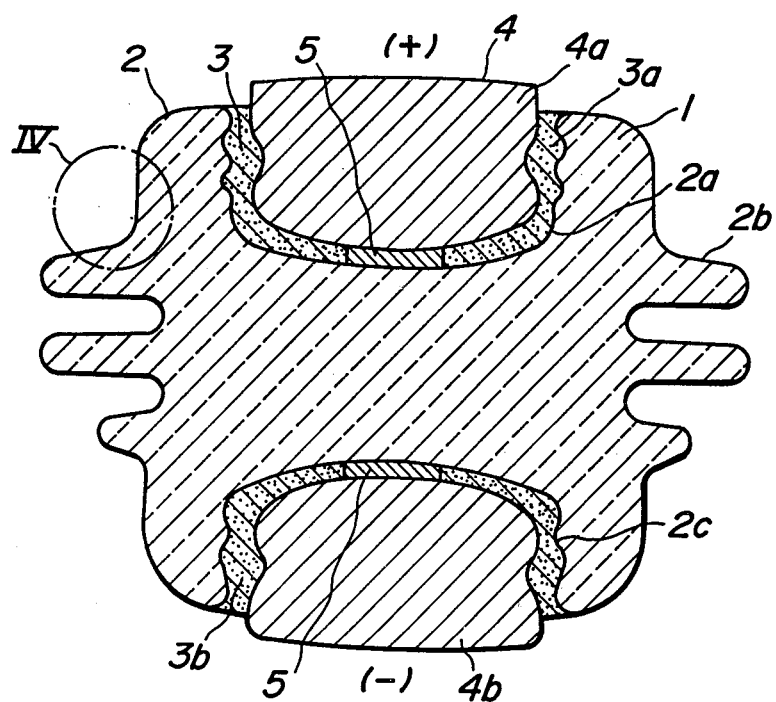
FIG. 3 is a crosssectional view of an embodiment of a porcelain insulator of the present invention.
Figure 4:
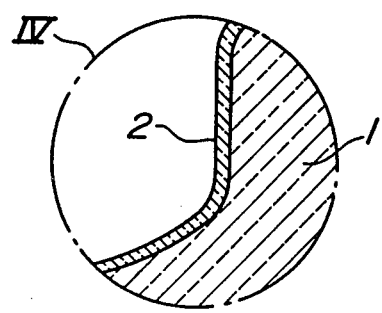
FIG. 4 is an enlarged partial view of part IV of FIG. 3.

Referring to FIGS. 3 and 4 which exemplify an embodiment of high voltage porcelain insulator of the present invention, procelain body 1 is coated with glaze 2 on surface thereof and has hardwares 4a and 4b which form a positive electrode and a negative electrode respectively and which are securely fixed in a couple of opposite holes of the porcelain body 1 through cement 3 via cork 5.

The inventors evaluated deterioration property of the porcelain insulator due to energization of DC voltage in the following way. Namely, a testing method was used for evaluation, wherein the porcelain insulators are applied with a DC high voltage, for example 10 kv per one insulator, for a certain period, for example one month, in an isothermal tank of e.g. 220° C., and initial value of power frequency puncture voltage in oil before application of the DC voltage is compared to that of after application of the DC voltage to determine a rate of the variation, or the porcelain insulator is applied with a DC high voltage until its breakdown and a time required for the breakdown is measured. Hereinafter, the testing method will be called as "ion accumulation test".

Deterioration property of the porcelain insulator in the ion accumulation test can be compared with deterioration property of the porcelain insulator in a practical use as follows. Namely, amount of accumulated charge $C_1$ (coulomb) of electric current i (ampere) flowed through the porcelain insulator until the time t (sec) required for breakdown of the porcelain insulator is expressed as follows.

$$C_1 = \int_0^t i\,dt$$

In the case of a post insulator as shown in FIG. 3 as an example of porcelain insulators, amount of the electric charge $C_0$ (coulomb) flowed through the post insulator during 50 years in an assumed situation of an average ambient temperature of 80° C. and applied voltage of 90 kv can be calculated from a resistance value $R_{25}$ ($\Omega$) of the post insulator at 25° C. and a temperature coefficient K of resistance value. A resistance value $R_{80}$ ($\Omega$) of the post insulator at 80° C., the electric current value i (ampere) and the amount of the electric charge $C_0$ (coulomb) during the 50 years are expressed by the following equations.

$R_{80} = R_{25} exp\ K \lesssim 1/(273+80) - 1/(273+25)\}$ $i = V/R = 90 \times 10^3/R_{80}$ $C_0 = it = (90 \times 10^3/R_{80}) \times 60 \times 60 \times 24 \times 365 \times 50 = 1.419 \times 10^{14}/R_{80}$ From the calculated amount of the electric charge $C_0$ (coulomb) during the 50 years and the amount of the accumulated charge $C_1$ (coulomb) until the breakdown of the post insulator in the ion accumulation test, an estimated life Y (years) of the post insulator (hereinafter abridged as "estimated life") can be expressed by the following formula.

$Y = 50 \times C_1/C_0$

The inventors have made many experiments leading to a finding that specific resistivity of a porcelain has a correlation with chemical composition of the porcelain, more precisely chemical composition and amount of vitreous phase of the porcelain. Generally, high voltage porcelain insulators are composed of crystal phases such as corundum, quartz, mullite and crystoballite, etc., and vitreous phase consisting mainly of silica, alumina, alkali metal oxides and alkaline earth metal oxides. Crystalline components have higher specific resistivity than vitreous component, and specific resistivity of vitreous component varies exponentially depending on chemical composition, while the ratio of the amount of crystalline components to the amount of vitreous component varies very little. As a result, specific resistivity of a porcelain varies substantially corresponding to chemical composition of the porcelain. Relation between chemical composition and specific resistivity of porcelains is shown in embodiments which will later be described, and a tendency has been found out that specific resistivity of a porcelain becomes lower when an amount of sodium oxide becomes higher relative to amounts of potassium oxide, barium oxide, magnesium oxide and calcium oxide.

Meanwhile, high voltage porcelain insulator is desired to have excellent electrical properties such as dielectric breakdown strength and the like as well as splendid physical properties such as hardness, tensile strength and the like. For satisfying these desired sufficient sintering of the porcelain in the firing process is important and proper selection of chemical composition of the porcelain is necessary. Increase of potassium oxide, barium oxide, magnesium oxide or calcium oxide in the porcelain has an effect of incresing the specific resistivity. However, if these ingredients are increased to exceed a certain amount, a sintered body of a dense structure cannot be obtained, so that these ingredients have to be limited to a certain range in order to satisfy both of the aforedescribed electrical properties and physical properties simultaneously. In other words, there is a limit in case of increasing these ingredients for increasing a specific resistivity of a porcelain.

The inventors prepared post insulators using porcelains which have high specific resistivity and excellent deterioration property in energization of DC voltage in test pieces test, and evaluated deterioration property of the post insulators due to energization of DC voltage by the ion accumulation test. As a result, the inventors have found out that also the post insulators have a tendency that, the larger the specific resistivity of the porcelains is, the better the deterioration property due to energization of DC voltage is, similarly as in the test of test pieces of porcelains per se. However, this tendency is not so noticeable as compared with the tendency of the test pieces test. Namely, it has become apparent that, if a specific resistivity of a porcelain is made high, so the duration of the porcelain insulator before its breakdown (estimated life) in the ion accumulation test is prolonged, while, if the specific resistivity reaches above a certain level, the estimated life approaches to a saturated state, and deterioration property of the procelain due to energization of DC voltage is not so improved as compared to the improvement of the specific resistivity.

When observed shape of insulators punctured by the ion accumulation test, one feature is found out that every punctured insulator shows a crack initiating from a portion of glaze on the porcelain surface which contacts with cement, i.e., a portion of glaze on the porcelain surface at which the electric current flows from a hardware to the glaze and further to the porcelain through the cement with the estimated maximum electric current density. Another feature is that the crack develops from the glaze portion on the positive electrode. For instance, in the case of a post insulator as shown in FIG. 3, it was found out that a crack was formed starting from the portion of glaze 2a which contacts around cork 5 at the hardware 4a of the positive electrode. Though a mechanism of breakdown or puncture of a porcelain insulator due to energization of DC voltage has not yet been completely analyzed, it is estimated from such shape of breakdown that a stress which breaks the porcelain insulator is related to the DC current which flows from the hardware to the glaze through the cement and further to the porcelain.

Considering these results, the inventors have conceived two counterplans, one counterplan being an enhancement of specific resistivity of the porcelain similarly as in the result of the test pieces test, and the other counterplan being an enhancement of specific resistivity of glaze in addition to enhancement of specific resistivity of the porcelain.

Glazes for high voltage porcelain insulator have a purpose of coloring a porcelain surface and a purpose of making the porcelain surface smooth when applied thereon. Besides, they have to be so properly selected that they have appropriate physical properties such as thermal expansion coefficient, hardness, Young's modulus, tensile strength and the like relative to porcelains, as described in U.S. Pat. No. 2,157,100 issued on May 9, 1939 for "Glazed Ceramic Insulator and the like". For that purpose, chemical compositions of glazes have generally less sodium oxide content and higher potassium oxide, barium oxide, magnesium oxide and calcium oxide contents as compared with vitreous components of porcelains. As a result, specific resistivities of these glazes are high as compared with specific resistivities of usual porcelains for high voltage insulators.

When evaluated by the ion accumulation test an insulator composed of a porcelain having a high specific resistivity and coated with a usual glaze having such high specific resistivity by means of deterioration property due to energization of DC voltage, the deterioration property is improved to a small extent with the increase of the specific resistivity of the porcelain. However, there is seen a tendency that the effect of improving the deterioration property is saturated as shown in the attached FIG. 2 even when the specific resistivity of the porcelain is enlarged over a certain level of value, and rather there is seen a tendency that the electrical properties such as power frequency puncture voltage in oil, etc. of the insulator before energization of DC voltage are deteriorated.

The inventors have also found out that an insulator composed of a porcelain having a high specific resistivity and coated with a glaze having a higher specific resistivity than usual glaze for high voltage insulator has an inferior deterioration property as compared with deterioration property of an insulator having a porcelain coated with a usual glaze for high voltage insulator.

The present invention obviates also the above disadvantages.

Hereinafter, the present invention will be explained in more detail with reference to FIGS. 3 and 4 which show an embodiment of the present invention. In the high voltage porcelain insulator shown in FIG. 3, a porcelain body 1 has a specific resistivity $\rho_p$ of $\rho_p \geq 5 \times 10^{13}$ $\Omega \cdot cm$. Surface of the porcelain body 1 has a coating of a glaze 2 which has a specific resistivity $\rho_g$ of $\rho_g < \rho_p$. The coated porcelain body 1 has been fixed between a couple of hardware 4 through cement 3. The glaze 2 and the hardware 4 has a cork 5 therebetween inserted as a spacer. Though porcelain insulator of the abovementioned structure has especially splendid property against breakdown due to energization of DC voltage, it can also be used under AC high voltage. Particularly, a porcelain insulator wherein a porcelain body has a specific resistivity $\rho_p$ of $1.0 \times 10^{14}$ $\Omega \cdot cm \leq \rho_p \leq 1.0 \times 10^{16}$ $\Omega \cdot cm$ and a glaze has a specific resistivity $\rho_g$ of $5.0 \times 10^{12}$ $\Omega \cdot cm \leq \rho_g \leq 5.0 \times 10^{14}$ $\Omega \cdot cm$ and the glaze is so selected as $\rho_g < \rho_p$, has remarkably superior deterioration property under energization of DC voltage. Besides, if the glaze has a specific resistivity $\rho_g$ of $\rho_g \geq 1.0 \times 10^{13}$ $\Omega \cdot cm$, the glaze has a low thermal expansion coefficient and a state occurs wherein the porcelain exerts a compression stress upon the glaze, so that a porcelain insulator can be obtained having improved mechanical strength. At this state of condition, if the glaze is so selected that the specific resistivity $\rho_g$ of the glaze is lower than that of a porcelain e.g. as $\rho_g < 0.8\rho_p$, electrical properties such as deterioration property due to energization of DC voltage and power frequency puncture voltage in oil and the like are improved, so that particularly preferable insulators can be obtained.

Shape of the porcelain insulator is not limited to specific one and any shape of porcelain insulator such as bushing shell, long rod type insulator, disc type suspension insulator and pin type insulator and the like can be used.

The glaze 2 having the specific resistivity according to the present invention is not necessarily applied on the whole surface of the porcelain 1. The desired effect of the present invention can be obtained by applying the glaze on one surface of either of a portion 2a of glaze contacting with cement 3a or a portion 2c of glaze contacting with another cement 3b, among the portion 2a of glaze contacting the cement 3a, a portion 2b of glaze exposed externally and the portion 2c of glaze contacting with another cement 3b. Of course, the glaze can be applied on the overall surface of the porcelain to obtain the desired effect.

The porcelain according to the present invention has chemical compositions as shown in the following Table 1.

TABLE 1

| Range | | I | II | III | IV |
|---|---|---|---|---|---|
| | | $35 \leq SiO_2 \leq 75$ | $35 \leq SiO_2 \leq 75$ | $35 \leq SiO_2 \leq 75$ | $35 \leq SiO_2 \leq 75$ |
| | | $15 \leq Al_2O_3 \leq 55$ | $15 \leq Al_2O_3 \leq 55$ | $15 \leq Al_2O_3 \leq 55$ | $15 \leq Al_2O_3 \leq 55$ |
| $R_2O$ | | $Na_2O \leq 0.5$ | $Na_2O \leq 0.5$ | $0.5 < Na_2O \leq 1.0$ | $1.0 < Na_2O \leq 1.5$ |
| | | $1.5 \leq K_2O \leq 4.5$ | $4.5 < K_2O \leq 7.0$ | $2.0 \leq K_2O \leq 7.0$ | $2.0 \leq K_2O \leq 7.0$ |
| RO | | $BaO \leq 7.0$ | $BaO \leq 7.0$ | $BaO \leq 7.0$ | $BaO \leq 7.0$ |
| | | $MgO \leq 3.0$ | $MgO \leq 3.0$ | $MgO \leq 3.0$ | $MgO \leq 3.0$ |
| | | $CaO \leq 3.0$ | $CaO \leq 3.0$ | $CaO \leq 3.0$ | $CaO \leq 3.0$ |

TABLE 1-continued

| Range | I | II | III | IV |
|---|---|---|---|---|
| | RO ≤ 7.0 | 1.0 ≤ RO ≤ 7.0 | 3.0 ≤ RO ≤ 7.0 | 5.0 ≤ RO ≤ 7.0 |
| | 4.0 ≤ (R$_2$O + RO) ≤ 11.0 | 5.5 < (R$_2$O + RO) ≤ 11.0 | 5.5 < (R$_2$O + RO) ≤ 11.0 | 8.0 < (R$_2$O + RO) ≤ 11.0 |

Notes:
R$_2$O = Na$_2$O + K$_2$O
RO = BaO + MgO + CaO

A porcelain having a chemical composition which falls within any one of the above ranges I, II, III and IV has a specific resistivity of $5.0 \times 10^{13}$ Ω·cm or more, showing suitable property as a porcelain for high voltage porcelain insulator of the present invention.

Among the porcelains of the above ranges, the porcelains of the ranges V and VI as shown in the following Table 2 have a specific resistivity of not less than $1.0 \times 10^{14}$ Ω·cm and not more than $1.0 \times 10^{16}$ Ω·cm, and have excellent properties for both of electrical properties and mechanical properties when used as procelains for high voltage porcelain insulators.

TABLE 2

| Range | V | VI |
|---|---|---|
| | 35 ≤ SiO$_2$ ≤ 75 | 35 ≤ SiO$_2$ ≤ 75 |
| | 15 ≤ Al$_2$O$_3$ ≤ 55 | 15 ≤ Al$_2$O$_3$ ≤ 55 |
| R$_2$O | 0.2 ≤ Na$_2$O ≤ 1.0 | 0.2 ≤ Na$_2$O ≤ 0.4 |
| | 2.0 ≤ K$_2$O ≤ 5.5 | 2.0 ≤ K$_2$O ≤ 4.5 |
| RO | 3.0 ≤ BaO ≤ 7.0 | BaO ≤ 7.0 |
| | MgO ≤ 1.0 | MgO ≤ 1.0 |
| | CaO ≤ 1.0 | CaO ≤ 1.0 |
| | 3.0 ≤ RO ≤ 7.0 | RO ≤ 7.0 |
| | 5.2 ≤ (R$_2$O+RO) ≤ 11.0 | 4.0 ≤ (R$_2$O+RO) ≤ 11.0 |

Glaze used in the porcelain insulator of the present invention has any of the chemical compositions as shown in the following Table 3.

TABLE 3

| Range | I | II | III |
|---|---|---|---|
| | 60 ≤ SiO$_2$ ≤ 75 | 60 ≤ SiO$_2$ ≤ 75 | 60 ≤ SiO$_2$ ≤ 70 |
| | 10 ≤ Al$_2$O$_3$ ≤ 20 | 15 ≤ Al$_2$O$_3$ ≤ 23 | 16 ≤ Al$_2$O$_3$ ≤ 21 |
| | 1.0 ≤ Na$_2$O ≤ 3.0 | 0.5 ≤ Na$_2$O ≤ 3.0 | 0.5 ≤ Na$_2$O ≤ 1.6 |
| | 5.0 ≤ K$_2$O ≤ 10.0 | 1.0 ≤ K$_2$O ≤ 5.0 | 2.0 ≤ K$_2$O ≤ 5.0 |
| RO | BaO ≤ 1.0 | BaO ≤ 1.0 | BaO ≤ 1.0 |
| | 1.0 ≤ MgO ≤ 4.0 | 5.0 < MgO ≤ 8.0 | 6.0 ≤ MgO ≤ 8.0 |
| | 1.0 ≤ CaO ≤ 4.0 | 0.2 ≤ CaO ≤ 1.0 | 0.2 ≤ CaO ≤ 0.7 |
| | 3.0 ≤ RO ≤ 8.0 | 6.0 ≤ RO ≤ 9.0 | 6.5 ≤ RO ≤ 8.0 |

The glazes of either one of the ranges I or II have a specific resistivity of $1.0 \times 10^{15}$ Ω·cm or less, and it is possible to select a glaze which can be used in combination with a porcelain of the present invention depending on a specific resistivity of the porcelain to be used. Besides, the glaze of the range II produces cordierite crystals during the firing and cooling process, so that thermal expansion coefficient of the glaze becomes low. Furthermore, by varying the content of sodium oxide in the range III, a glaze can be obtained which has a specific resistivity $\rho_g$ of $\rho_g \geq 1.0 \times 10^{13}$ Ω·cm and a low thermal expansion coefficient owing to production of cordierite crystals as well as exceedingly smooth and lustrous surface.

Hereinafter, advantageous effects of the high voltage porcelain insulator of the present invention will be explained with reference to Examples. In Examples, all percentages are shown by weight basis, unless otherwise specified.

EXAMPLE 1

Ten % of alumina, 20% of silica sand, 30% of feldspar-A and 40% of clay are ground in wet process using water to prepare a body slip containing 45% of water. The body slip is dewatered, extruded through de-airing pugmill, dried and then sintered in air at a maximum temperature of 1,280° C. for 1 hour to obtain sample No. P1 as a sample for measuring a specific resistivity by a ceramic material testing method (JIS C2141 according to Japanese Industrial Standard) and for measuring dielectric breakdown voltage by a ceramic dielectric material testing method according to DIN (VDE0335/7.56). The materials used herein have chemical composition as shown in the following Table 4.

TABLE 4

| | Chemical composition (%) | | | | | | | |
|---|---|---|---|---|---|---|---|---|
| Materials | SiO$_2$ | Al$_2$O$_3$ | CaO | MgO | BaO | K$_2$O | Na$_2$O | Ig. loss |
| Alumina | 0.02 | 99.76 | 0.01 | 0.01 | — | 0.00 | 0.18 | 0.68 |
| Silica sand | 97.92 | 0.92 | 0.05 | 0.04 | — | 0.32 | 0.03 | 0.62 |
| Feldspar-A | 67.42 | 16.87 | 0.06 | 0.03 | — | 13.58 | 0.81 | 0.95 |
| Feldspar-B | 67.84 | 18.35 | 0.46 | 0.03 | — | 9.65 | 2.89 | 0.72 |
| Feldspar-C | 78.45 | 12.71 | 0.58 | 0.03 | — | 0.66 | 6.09 | 0.66 |
| Talc | 61.89 | 0.10 | 0.08 | 31.62 | — | 0.01 | 0.01 | 5.33 |
| Dolomite | 1.52 | 0.14 | 35.21 | 18.06 | — | 0.03 | 0.01 | 44.83 |
| Barium carbonate | — | — | — | — | 77.58 | — | — | 22.38 |
| Clay | 50.86 | 34.76 | 0.42 | 0.13 | — | 1.47 | 0.18 | 11.52 |

In the same way as in the above sample No. P1, porcelains are prepared in recipes as shown in the following Table 5 and numbered as sample Nos. P2–P21. On these porcelains are measured chemical composition, sintering property, specific resistivity as 25° C. according to JIS C2141 method, dielectric breakdown voltage according to DIN VDE0335/7.56, dielectric breakdown voltage according to DIN VDE0335/7.56 after energization of DC voltage of 4 kv per one sample in an isothermal tank of 160° C. for 15 days and rate of the variation (in this case, rate of decrease) of the dielectric breakdown voltage. The results are also summarized in the following Table 5 in addition to the results of the abovementioned sample No. P1. In the sintering property of the porcelains shown in the Table 5, the symbol A means an adequately sintered state because penetration of a dye into the fired porcelain is not seen in a dyeing penetration test and besides a bubble cannot be recognized on a crosssection of the fired porcelain by a naked eye, the symbol B shows an insufficiently sintered state of a porcelain because penetration of a dye into the fired procelain is seen in a dyeing penetration test, and the symbol C shows oversintered state of a porcelain because minute bubbles are recognized on a crosssection of the fired porcelain by a naked eye.

of potassium oxide content, barium oxide content, magnesium oxide content and calcium oxide content in the porcelain. The alkali metal components and the alkaline earth metal components are closely related to the sintering property of the porcelain. If the sum of these components is low, a tendency of insufficient sintering occurs, while if the sum is high, a tendency of oversintering occurs. When taking the sintering property and the specific resistivity of the porcelains into consideration, preferably the procelain has a composition of 1.5% or less of sodium oxide, 7.0% or less of potassium oxide, 7.0% or less of barium oxide, 3.0% or less of magnesium oxide and 3.0% or less of calcium oxide, the sum of

TABLE 5

| Sample No. | | P1 | P2 | P3 | P4 | P5 | P6 | P7 | P8 | P9 | P10 |
|---|---|---|---|---|---|---|---|---|---|---|---|
| Recipe (wt %) | Alumina | 20 | 20 | 20 | 20 | 10 | 10 | 10 | 10 | 10 | 10 |
| | Silica sand | 10 | 10 | 10 | 20 | 20 | 20 | 20 | 20 | 20 | 20 |
| | Feldspar-A | 30 | 15 | 0 | 21 | 30 | 29 | 28 | 26 | 24 | 20 |
| | Feldspar-B | 0 | 15 | 30 | 0 | 0 | 0 | 0 | 0 | 0 | 0 |
| | Talc | 0 | 0 | 0 | 0 | 0 | 0 | 0 | 0 | 0 | 2 |
| | Dolomite | 0 | 0 | 0 | 0 | 0 | 0 | 0 | 0 | 0 | 2 |
| | Barium carbonate | 0 | 0 | 0 | 4 | 0 | 1 | 2 | 4 | 6 | 6 |
| | Clay | 40 | 40 | 40 | 35 | 40 | 40 | 40 | 40 | 40 | 40 |
| Chemical composition (wt %) | $SiO_2$ | 52.2 | 53.1 | 52.2 | 52.9 | 61.8 | 62.5 | 61.5 | 61.7 | 60.7 | 58.1 |
| | $Al_2O_3$ | 41.2 | 39.9 | 41.6 | 36.1 | 31.3 | 29.8 | 30.1 | 28.9 | 29.2 | 29.4 |
| | $Na_2O$ $\}$ $R_2O$ | 0.6 | 0.7 | 1.0 | 0.3 | 0.6 | 0.3 | 0.3 | 0.3 | 0.3 | 0.3 |
| | $K_2O$ | 4.7 | 4.4 | 3.7 | 3.4 | 5.1 | 4.9 | 4.7 | 4.2 | 3.9 | 3.6 |
| | BaO $\}$ RO | 0.0 | 0.0 | 0.0 | 3.2 | 0.0 | 0.7 | 1.7 | 3.3 | 4.5 | 5.1 |
| | MgO | 0.1 | 0.1 | 0.1 | 0.1 | 0.1 | 0.1 | 0.1 | 0.1 | 0.1 | 0.9 |
| | CaO | 0.2 | 0.3 | 0.3 | 0.2 | 0.2 | 0.2 | 0.2 | 0.2 | 0.2 | 1.0 |
| | RO | 0.3 | 0.4 | 0.4 | 3.5 | 0.3 | 1.0 | 2.0 | 3.6 | 4.8 | 7.0 |
| | $R_2O + RO$ | 5.6 | 5.5 | 5.1 | 7.2 | 6.0 | 6.2 | 7.0 | 8.1 | 9.0 | 10.9 |
| Sintering property of porcelain | | A | A | A | A | A | A | A | A | A | A |
| Specific resistivity of porcelain ($\Omega \cdot cm$) 25° C. | | $2.2 \times 10^{13}$ | $2.4 \times 10^{12}$ | $1.8 \times 10^{11}$ | $3.2 \times 10^{14}$ | $2.6 \times 10^{13}$ | $5.2 \times 10^{13}$ | $7.7 \times 10^{13}$ | $2.1 \times 10^{14}$ | $6.3 \times 10^{14}$ | $9.0 \times 10^{15}$ |
| Dielectric breakdown voltage (kv/mm) | Initial value | 41.3 | 38.5 | 40.6 | 42.1 | 43.8 | 46.4 | 45.4 | 46.6 | 45.3 | 27.2 |
| | After energization of DC voltage | 35.9 | thermal runaway | thermal runaway | 37.9 | 36.8 | 44.7 | 42.5 | 45.9 | 44.7 | 27.1 |
| | Rate of decrease (%) | 13.1 | — | — | 10.0 | 16.0 | 3.7 | 6.4 | 1.5 | 1.3 | 0.4 |

| Sample No. | | P11 | P12 | P13 | P14 | P15 | P16 | P17 | P18 | P19 | P20 | P21 |
|---|---|---|---|---|---|---|---|---|---|---|---|---|
| Recipe (wt %) | Alumina | 10 | 20 | 20 | 20 | 20 | 30 | 30 | 30 | 30 | 20 | 20 |
| | Silica sand | 30 | 15 | 15 | 24 | 22 | 5 | 10 | 5 | 5 | 20 | 25 |
| | Feldspar-A | 18 | 28 | 28 | 15 | 20 | 29 | 20 | 21 | 21 | 18 | 15 |
| | Feldspar-B | 0 | 0 | 0 | 0 | 0 | 0 | 0 | 0 | 0 | 0 | 0 |
| | Talc | 0 | 2 | 0 | 3 | 2 | 2 | 5 | 5 | 5 | 2 | 0 |
| | Dolomite | 0 | 0 | 2 | 4 | 2 | 2 | 2 | 5 | 5 | 0 | 0 |
| | Barium carbonate | 2 | 0 | 0 | 4 | 4 | 2 | 3 | 6 | 4 | 0 | 0 |
| | Clay | 40 | 35 | 35 | 30 | 30 | 30 | 30 | 30 | 30 | 40 | 40 |
| Chemical composition (wt %) | $SiO_2$ | 64.3 | 54.2 | 54.5 | 53.8 | 54.5 | 42.5 | 44.0 | 38.4 | 40.2 | 55.7 | 57.7 |
| | $Al_2O_3$ | 29.1 | 38.6 | 38.6 | 34.7 | 35.4 | 47.3 | 45.8 | 46.5 | 46.6 | 38.8 | 37.7 |
| | $Na_2O$ $\}$ $R_2O$ | 0.3 | 0.3 | 0.3 | 0.2 | 0.3 | 0.4 | 0.3 | 0.3 | 0.3 | 0.3 | 0.2 |
| | $K_2O$ | 3.2 | 4.7 | 4.3 | 3.0 | 3.4 | 4.8 | 3.3 | 3.8 | 3.7 | 3.2 | 2.9 |
| | BaO $\}$ RO | 1.7 | 0.0 | 0.0 | 3.4 | 3.3 | 1.7 | 2.5 | 5.2 | 3.2 | 0.0 | 0.0 |
| | MgO | 0.1 | 0.8 | 0.5 | 1.8 | 0.9 | 0.9 | 2.1 | 2.6 | 2.6 | 0.6 | 0.1 |
| | CaO | 0.2 | 0.3 | 0.7 | 1.7 | 0.9 | 0.9 | 0.9 | 2.0 | 2.0 | 0.2 | 0.2 |
| | RO | 2.0 | 1.1 | 1.2 | 6.9 | 5.1 | 3.5 | 5.5 | 9.8 | 7.8 | 0.8 | 0.3 |
| | $R_2O + RO$ | 5.5 | 6.1 | 5.8 | 10.1 | 8.8 | 8.7 | 9.1 | 13.9 | 11.8 | 4.3 | 3.4 |
| Sintering property of porcelain | | A | A | A | A | A | A | A | C | C | A | B |
| Specific resistivity of porcelain ($\Omega \cdot cm$) 25° C. | | $1.3 \times 10^{14}$ | $7.5 \times 10^{13}$ | $1.1 \times 10^{14}$ | $1.8 \times 10^{16}$ | $3.2 \times 10^{15}$ | $5.4 \times 10^{14}$ | $7.2 \times 10^{15}$ | $1.7 \times 10^{17}$ | $4.2 \times 10^{16}$ | $1.5 \times 10^{14}$ | X |
| Dielectric breakdown voltage (kv/mm) | Initial value | 44.5 | 41.9 | 42.8 | 37.3 | 38.1 | 36.2 | 32.6 | 18.3 | 27.8 | 36.5 | X |
| | After energization of DC voltage | 42.7 | 40.1 | 40.7 | 37.1 | 38.0 | 36.0 | 32.5 | 18.2 | 27.6 | 36.4 | X |
| | Rate of decrease (%) | 4.0 | 4.3 | 4.9 | 0.5 | 0.3 | 0.6 | 0.3 | 0.5 | 0.7 | 0.3 | X |

Note: X shows that the test was not conducted.

From the chemical compositions of the porcelains shown in Table 5, a tendency is observed that a specific resistivity of a porcelain increases with decrease of sodium oxide content in the porcelain or with increase these components being 4–11.0%.

When comparing rates of decrease of dielectric breakdown voltage of these porcelains due to energization of DC voltage, a tendency is noted that as a whole a porcelain of a larger specific resistivity has less rate of decrease of dielectric breakdown voltage and initial value of dielectric breakdown voltage becomes low if the specific resistivity is increased to more than $10^{16}$ $\Omega \cdot$cm by increasing the alkaline earth metal components. This phenomenon is estimated to have a relation to the sintering property of the porcelains. The values of rate of decrease in % of dielectric breakdown voltage relative to specific resistivity $\rho_p$ in $\Omega \cdot$cm of the porcelains in Table 5 are plotted in attached FIG. 1.

Using the same materials as those shown in Table 4, glazes for applying on surface of insulators are prepared based on recipes as shown in the following Table 6. The glazes of the recipes shown in Table 6 are allotted with sample Nos. G1–G18, and their chemical compositions and specific resistivities measured at 25° C. according to JIS C2141 method are also shown in Table 6.

From the Table 6 a tendency is seen that glazes to be used for high voltage porcelain insulators have usually higher alkaline earth metals content as compared with the porcelains and have high specific resistivity. However, similarly as in the case of specific resistivity of the porcelains, a tendency is observed that the specific resistivity of glazes becomes low when the content of sodium oxide becomes high. Particularly, the glazes of sample Nos. G6–G14 exhibit excellent properties as glazes for applying on high voltage porcelain insulators, because they form cordierite crystals therein during the firing and cooling process and they have low thermal expansion coefficient as well as low specific resistivity despite the high content of magnesium oxide therein. Therefore, they are particularly preferable as glazes in the present invention.

Post insulators as shown in FIG. 3 are produced by applying glazes of Table 6 on the porcelains of Table 5.

TABLE 6

| Sample No. | | G1 | G2 | G3 | G4 | G5 | G6 | G7 | G8 | G9 |
|---|---|---|---|---|---|---|---|---|---|---|
| Recipe (wt %) | Alumina | 0 | 0 | 0 | 0 | 0 | 10 | 10 | 10 | 10 |
| | Silica sand | 2 | 22 | 22 | 22 | 30 | 20 | 20 | 30 | 31 |
| | Feldspar-A | 0 | 0 | 10 | 10 | 10 | 0 | 0 | 0 | 0 |
| | Feldspar-B | 83 | 63 | 53 | 50 | 46 | 35 | 30 | 29 | 23 |
| | Feldspar-C | 0 | 0 | 0 | 3 | 0 | 5 | 10 | 0 | 5 |
| | Talc | 2 | 0 | 0 | 0 | 0 | 19 | 19 | 21 | 20 |
| | Dolomite | 6 | 8 | 8 | 8 | 7 | 1 | 1 | 0 | 1 |
| | Barium carbonate | 0 | 0 | 0 | 0 | 0 | 0 | 0 | 0 | 0 |
| | Clay | 7 | 7 | 7 | 7 | 7 | 10 | 10 | 10 | 10 |
| Chemical composition (wt %) | $SiO_2$ | 65.5 | 70.6 | 70.1 | 71.0 | 73.6 | 65.6 | 66.5 | 68.6 | 68.9 |
| | $Al_2O_3$ | 17.9 | 14.4 | 14.9 | 14.4 | 13.3 | 21.0 | 20.6 | 19.3 | 18.8 |
| | $Na_2O$ $\}$ $R_2O$ | 2.5 | 1.9 | 1.8 | 1.8 | 1.4 | 1.4 | 1.6 | 0.9 | 1.1 |
| | $K_2O$ | 8.6 | 6.8 | 7.2 | 6.6 | 6.3 | 3.8 | 3.2 | 2.9 | 2.5 |
| | BaO $\}$ RO | 0.0 | 0.0 | 0.0 | 0.0 | 0.0 | 0.0 | 0.0 | 0.0 | 0.0 |
| | MgO | 1.7 | 1.7 | 1.7 | 1.6 | 1.4 | 6.3 | 6.2 | 6.8 | 6.8 |
| | CaO | 2.5 | 3.4 | 3.2 | 3.4 | 2.9 | 0.6 | 0.6 | 0.2 | 0.6 |
| | RO | 4.2 | 5.1 | 4.9 | 5.0 | 4.3 | 6.9 | 6.8 | 7.0 | 7.4 |
| | $R_2O + RO$ | 15.3 | 13.8 | 13.9 | 13.4 | 12.0 | 12.1 | 11.6 | 10.8 | 11.0 |
| Specific resistivity of glaze ($\Omega \cdot$ cm) 25° C. | | $3.6 \times 10^{11}$ | $2.3 \times 10^{12}$ | $4.6 \times 10^{12}$ | $3.0 \times 10^{12}$ | $5.2 \times 10^{12}$ | $4.1 \times 10^{13}$ | $1.2 \times 10^{13}$ | $1.5 \times 10^{14}$ | $6.3 \times 10^{13}$ |
| Sample No. | | G10 | G11 | G12 | G13 | G14 | G15 | G16 | G17 | G18 |
| Recipe (wt %) | Alumina | 10 | 10 | 10 | 10 | 10 | 7 | 6 | 6 | 6 |
| | Silica sand | 20 | 30 | 30 | 31 | 20 | 44 | 44 | 46 | 43 |
| | Feldspar-A | 0 | 0 | 4 | 3 | 13 | 0 | 0 | 4 | 4 |
| | Feldspar-B | 32 | 22 | 20 | 25 | 25 | 20 | 20 | 15 | 15 |
| | Feldspar-C | 6 | 7 | 5 | 0 | 0 | 0 | 0 | 0 | 0 |
| | Talc | 21 | 21 | 21 | 20 | 21 | 2 | 0 | 0 | 1 |
| | Dolomite | 1 | 0 | 0 | 1 | 1 | 8 | 8 | 10 | 5 |
| | Barium carbonate | 0 | 0 | 0 | 0 | 0 | 7 | 10 | 7 | 14 |
| | Clay | 10 | 10 | 10 | 10 | 10 | 12 | 12 | 12 | 12 |
| Chemical composition (wt %) | $SiO_2$ | 65.6 | 69.2 | 69.1 | 68.6 | 65.2 | 68.9 | 67.1 | 69.6 | 66.0 |
| | $Al_2O_3$ | 20.6 | 18.8 | 19.1 | 19.0 | 20.8 | 15.4 | 15.2 | 14.6 | 14.9 |
| | $Na_2O$ $\}$ $R_2O$ | 1.5 | 1.1 | 1.0 | 0.8 | 0.9 | 0.7 | 0.7 | 0.6 | 0.6 |
| | $K_2O$ | 3.3 | 2.4 | 2.9 | 3.3 | 4.4 | 2.5 | 2.6 | 2.3 | 2.3 |
| | BaO $\}$ RO | 0.0 | 0.0 | 0.0 | 0.0 | 0.0 | 5.9 | 8.5 | 6.1 | 12.1 |
| | MgO | 7.2 | 6.9 | 6.7 | 6.6 | 6.8 | 2.2 | 1.4 | 1.9 | 1.3 |
| | CaO | 0.6 | 0.2 | 0.2 | 0.7 | 0.6 | 3.2 | 3.3 | 3.8 | 1.8 |
| | RO | 7.8 | 7.1 | 6.9 | 7.3 | 7.4 | 11.3 | 13.2 | 11.8 | 15.2 |
| | $R_2O + RO$ | 12.6 | 10.6 | 10.8 | 11.4 | 12.7 | 14.5 | 16.5 | 14.7 | 18.1 |
| Specific resistivity of glaze ($\Omega \cdot$ cm) 25° C. | | $4.6 \times 10^{13}$ | $3.2 \times 10^{13}$ | $8.2 \times 10^{13}$ | $4.7 \times 10^{14}$ | $6.1 \times 10^{14}$ | $5.8 \times 10^{15}$ | $7.3 \times 10^{15}$ | $1.6 \times 10^{16}$ | $2.3 \times 10^{16}$ |

Mixtures of the raw materials of determined recipes are ground in wet process using water to produce glaze slips of a water content of 50%. The slips are dewatered on a gypsum board, dried and then fired in the same condition with the condition of firing the porcelains to prepare glaze samples for measuring the specific resistivity according to JIS C2141 method.

The post insulators are so prepared that it has, after firing, a total length of 80 mm, a porcelain thickness between hardwares of 20 mm, a diameter of holes for the hardwares of 60 mm and a thickness of glaze of 0.20–0.40 mm. Ion accumulation test is conducted at a condition of an ambient temperature of 220° C. and an applied voltage of 4 kv per one post insulator to calculate estimated life of the post insulators. The results are shown in the following Table 7.

TABLE 7

| Sample No. | Sample of the present invention | | | | | | | |
|---|---|---|---|---|---|---|---|---|
| | I1 | I2 | I3 | I4 | I5 | I6 | I7 | I8 |
| Porcelain Sample No. | P6 | | P11 | | P16 | | P17 | |
| Specific resistivity of porcelain $\rho_p$ ($\Omega \cdot$ cm) 25° C. | $5.2 \times 10^{13}$ | | $1.3 \times 10^{14}$ | | $5.4 \times 10^{14}$ | | $7.2 \times 10^{15}$ | |
| Glaze sample No. | G1 | G3 | G11 | G9 | G11 | G9 | G9 | G15 |
| Specific resistivity of glaze $\rho_g$ ($\Omega \cdot$ cm) 25° C. | $3.6 \times 10^{11}$ | $4.6 \times 10^{12}$ | $3.2 \times 10^{13}$ | $6.3 \times 10^{13}$ | $3.2 \times 10^{13}$ | $6.3 \times 10^{13}$ | $6.3 \times 10^{13}$ | $5.8 \times 10^{15}$ |
| Ratio of specific resistivity of glaze relative to specific resistivity of porcelain (%) | 0.7 | 9 | 25 | 48 | 6 | 12 | 0.9 | 81 |
| Resistance value of $3.4 \times 10^{12}$ insulator R ($\Omega$) 25° C. | $3.3 \times 10^{12}$ | $8.6 \times 10^{12}$ | $8.7 \times 10^{12}$ | $3.4 \times 10^{13}$ | $3.5 \times 10^{13}$ | $4.1 \times 10^{14}$ | $4.1 \times 10^{14}$ | |
| Temperature coefficient of resistance value K | 9,040 | 9,060 | 9,320 | 9,350 | 9,560 | 9,510 | 9,980 | 9,930 |
| Ion accumulation test | | | | | | | | |
| Amount of electric charge equivalent to 50 years $C_0$ (coulomb) | 130 | 134 | 54 | 53 | 14 | 13 | 1.2 | 1.2 |
| Amount of electric charge until breakdown $C_1$ (coulomb) | >130 | >134 | >54 | >53 | >14 | >13 | >1.2 | >1.2 |
| Estimated life (years) | >50 | >50 | >50 | >50 | >50 | >50 | >50 | >50 |

| Sample No. | Sample of the present invention | | Reference sample | | | | | |
|---|---|---|---|---|---|---|---|---|
| | I9 | I10 | I11 | I12 | I13 | I14 | I15 | I16 |
| Porcelain Sample No. | P14 | | P1 | | P11 | P16 | P17 | P14 |
| Specific resistivity of porcelain $\rho_p$ ($\Omega \cdot$ cm) 25° C. | $1.8 \times 10^{16}$ | | $2.2 \times 10^{13}$ | | $1.3 \times 10^{14}$ | $5.4 \times 10^{14}$ | $7.2 \times 10^{15}$ | $1.8 \times 10^{16}$ |
| Glaze sample No. | G9 | G17 | G1 | G11 | G8 | G14 | G16 | G18 |
| Specific resistivity of glaze $\rho_g$ ($\Omega \cdot$ cm) 25° C. | $6.3 \times 10^{13}$ | $1.6 \times 10^{16}$ | $3.6 \times 10^{11}$ | $3.2 \times 10^{13}$ | $1.5 \times 10^{14}$ | $6.1 \times 10^{14}$ | $7.3 \times 10^{15}$ | $2.3 \times 10^{16}$ |
| Ratio of specific resistivity of glaze relative to specific resistivity of porcelain (%) | 0.4 | 89 | 1.6 | 145 | 115 | 113 | 101 | 128 |
| Resistance value of insulator R ($\Omega$) 25° C. | $9.6 \times 10^{14}$ | $9.8 \times 10^{14}$ | $1.2 \times 10^{12}$ | $1.2 \times 10^{12}$ | $8.6 \times 10^{12}$ | $3.5 \times 10^{13}$ | $4.0 \times 10^{14}$ | $9.6 \times 10^{14}$ |
| Temperature coefficient of resistance value K | 10,040 | 10,150 | 8,750 | 8,730 | 9,350 | 9,490 | 9,970 | 10,070 |
| Ion accumulation test | | | | | | | | |
| Amount of electric charge equivalent to 50 years $C_0$ (coulomb) | 0.52 | 0.52 | 354 | 353 | 53 | 13 | 1.2 | 0.52 |
| Amount of electric charge until breakdown $C_1$ (coulomb) | >0.52 | >0.52 | 234 | 127 | 40 | 11 | 1.1 | 0.46 |
| Estimated life (years) | >50 | >50 | 33 | 18 | 38 | 42 | 46 | 44 |

Figure 2:
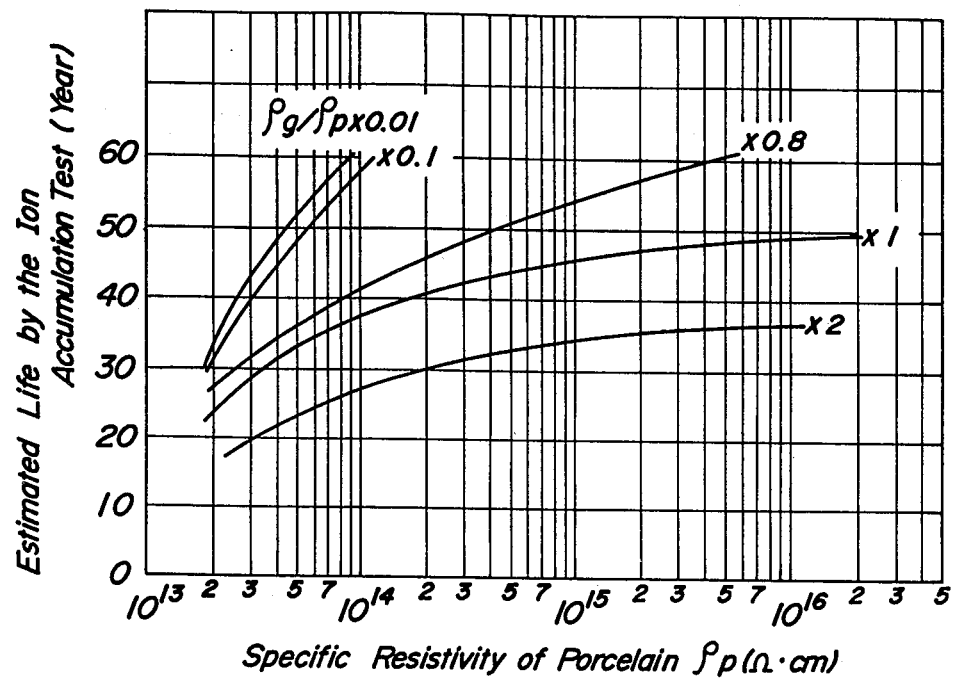
FIG. 2 is a characteristic graph of ion accumulation test of porcelain insulators showing estimated life (years) by the ion accumulation test in relation to specific resistivity $\rho_p$ of porcelains.

The relation of the estimated life (years) between the specific resistivity $\rho_p$ ($\Omega \cdot$cm) of the porcelain shown in the above Table 7 is also illustrated in attached FIG. 2.

As seen from the above Table 7 all the sample Nos. I1–I10 wherein the combinations of the specific resistivity of porcelain and the specific resistivity of glaze are within the range of the present invention exhibit noticeably excellent results showing estimated life of more than 50 years in the ion accumulation test.

In contrast, referential sample Nos. I11–I12 prepared for comparison have specific resistivity of porcelain of lower than $5.0 \times 10^{13}$ $\Omega \cdot$cm and estimated lives thereof in the ion accumulation test are less than 50 years regardless whether the specific resistivity of glaze is higher or lower than the specific resistivity of porcelain. Also, referential sample Nos. I13–I16 of the insulators wherein glazes having higher specific resistivity than specific resistivity of porcelains are applied on the porcelains have no remarkable effect which would be brought from increase of the specific resistivity of the porcelains and estimated lives thereof in the ion accumulation test do not reach 50 years, even though the used porcelains have a specific resistivity of more than $5.0 \times 10^{13}$ $\Omega \cdot$cm.

EXAMPLE 2

Porcelain sample Nos. P6, P10, P11, P14, P15 and P19 of the recipes as shown in Example 1 and having the same shape with the porcelains of Example 1 are prepared in the same way as in Example 1 and applied with glaze sample Nos. G2, G5, G6, G7, G8, G10, G12, G13, G15, G16 and G18 of the recipes shown in Example 1, and fired and thereafter bonded with hardwares with the aid of cement to form post insulators as shown in FIGS. 3 and 4. These post insulators are shown as samples Nos. I17–I31 in the following Table 8.

Power frequency puncture test in oil and temperature cycle test according to JIS C3810, ion accumulation test, and power frequency puncture test in oil after the ion accumulation test, are conducted on these post insulators. The results are shown in the following Table 8. The ion accumulation test is effected at an ambient temperature of 220° C. with an applied voltage of 5 kv per one insulator. When the post insulators are not punctured even when the amount of electric charge reached an amount of electric charge $C_0$ (coulomb) which corresponds to an amount of electric charge of during 50 years in the ion accumulation tests, the ion accumulation tests are interrupted and power frequency puncture voltage in oil is measured to evaluate deterioration property by comparing it with the value of the power frequency puncture voltage in oil obtained before conducting the ion accumulation test. These results are also shown in Table 8.

of decrease of power frequency puncture voltage in oil after the ion accumulation test. Insulator sample Nos. I19, I20 and I22-I29 wherein the porcelains have a specific resistivity $\rho_p$ of $\rho_p \geq 5 \times 10^{13}$ Ω·cm and the glazes have a specific resistivity $\rho_g$ of $\rho_g \geq 1.0 \times 10^{13}$ Ω·cm and $\rho_g < 0.8 \times \rho_p$ have an estimated life of more than 50 years in the ion accumulation test as well as high strength in temperature cycle test. Summing up these results, porcelain insulators wherein porcelains having a

TABLE 8

| Sample No. | I17 | I18 | I19 | I20 | I21 | I22 | I23 |
|---|---|---|---|---|---|---|---|
| Porcelain sample No. | | | P6 | | | P11 | |
| Specific resistivity of porcelain $\rho_p$ (Ω · cm) 25° C. | | | $5.2 \times 10^{13}$ | | | $1.3 \times 10^{14}$ | |
| Glaze sample No. | G2 | G5 | G7 | G6 | G10 | G6 | G12 |
| Specific resistivity of glaze $\rho_g$ (Ω · cm) 25° C. | $2.3 \times 10^{12}$ | $5.2 \times 10^{12}$ | $1.2 \times 10^{13}$ | $4.1 \times 10^{13}$ | $4.6 \times 10^{13}$ | $4.1 \times 10^{13}$ | $8.2 \times 10^{13}$ |
| Ratio of specific resistivity of glaze relative to specific resistivity of porcelain (%) | 4 | 10 | 23 | 79 | 88 | 32 | 63 |
| Resistance value of insulator R (Ω) 25° C. | $3.3 \times 10^{12}$ | $3.3 \times 10^{12}$ | $3.4 \times 10^{12}$ | $3.3 \times 10^{12}$ | $3.4 \times 10^{12}$ | $8.8 \times 10^{12}$ | $8.6 \times 10^{12}$ |
| Temperature coefficient of resistance value K | 9,120 | 9,070 | 9,060 | 9,110 | 9,180 | 9,450 | 9,470 |
| Temperature difference in temperature cycle test (°C.) | 70 | 80 | >90 | >90 | >90 | >90 | >90 |
| Power frequency puncture voltage in oil (kv) | 283 | 280 | 284 | 279 | 262 | 292 | 286 |
| Ion accumulation test | | | | | | | |
| Amount of the electric charge corresponding to 50 years $C_0$ (coulomb) | 135 | 133 | 130 | 135 | 131 | 53 | 54 |
| Amount of the electric charge until breakdown $C_1$ (coulomb) | >135 | >133 | >130 | >135 | >131 | >53 | >54 |
| Estimated life (years) | >50 | >50 | >50 | >50 | >50 | >50 | >50 |
| Power frequency puncture voltage after ion accumulation test (kv) | 275 | 272 | 273 | 262 | 238 | 290 | 285 |
| Rate of decrease (%) | 2.8 | 2.9 | 3.9 | 6.1 | 9.2 | 0.7 | 0.3 |

| Sample No. | I24 | I25 | I26 | I27 | I28 | I29 | I30 | I31 |
|---|---|---|---|---|---|---|---|---|
| Porcelain sample No. | P15 | | | P10 | | | P14 | P19 |
| Specific resistivity of porcelain $\rho_p$ (Ω · cm) 25° C. | $3.2 \times 10^{15}$ | | | $9.0 \times 10^{15}$ | | | $1.8 \times 10^{16}$ | $4.2 \times 10^{16}$ |
| Glaze sample No. | G6 | G12 | G8 | G13 | G15 | G16 | G15 | G18 |
| Specific resistivity of glaze $\rho_g$ (Ω · cm) 25° C. | $4.1 \times 10^{13}$ | $8.2 \times 10^{13}$ | $1.5 \times 10^{14}$ | $4.7 \times 10^{14}$ | $5.8 \times 10^{15}$ | $7.3 \times 10^{15}$ | $6.1 \times 10^{14}$ | $2.3 \times 10^{16}$ |
| Ratio of specific resistivity of glaze relative to specific resistivity of porcelain (%) | 1.3 | 2.6 | 1.7 | 5 | 64 | 81 | 3 | 55 |
| Resistance value of insulator R (Ω) 25° C. | $1.9 \times 10^{14}$ | $2.0 \times 10^{14}$ | $5.8 \times 10^{14}$ | $5.6 \times 10^{14}$ | $5.7 \times 10^{14}$ | $5.8 \times 10^{14}$ | $9.7 \times 10^{14}$ | $2.7 \times 10^{15}$ |
| Temperature coefficient of resistance value K | 9,360 | 9,350 | 9,820 | 9,760 | 9,790 | 9,770 | 9,720 | 9,960 |
| Temperature difference in temperature cycle test (°C.) | >90 | >90 | >90 | >90 | >90 | >90 | >90 | >90 |
| Power frequency puncture voltage in oil (kv) | 289 | 287 | 267 | 263 | 265 | 258 | 207 | 197 |
| Ion accumulation test | | | | | | | | |
| Amount of the electric charge corresponding to 50 years $C_0$ (coulomb) | 2.4 | 2.3 | 0.84 | 0.86 | 0.85 | 0.83 | 0.49 | 0.18 |
| Amount of the electric charge until breakdown $C_1$ (coulomb) | >2.4 | >2.3 | >0.84 | >0.86 | >0.85 | >0.83 | >0.49 | >0.18 |
| Estimated life (years) | >50 | >50 | >50 | >50 | >50 | >50 | >50 | >50 |
| Power frequency puncture voltage after ion accumulation test (kv) | 286 | 285 | 265 | 257 | 255 | 243 | 192 | 172 |
| Rate of decrease (%) | 1.0 | 0.7 | 0.7 | 2.3 | 3.8 | 5.8 | 7.2 | 12.7 |

From the results as shown in the above Table 8 the insulator sample Nos. I17-I31 wherein the porcelains have a specific resistivity $\rho_p$ of $\rho_p \geq 5.0 \times 10^{13}$ Ω·cm and the glazes have a specific resistivity $\rho_g$ of $\rho_g < \rho_p$ have an estimated life of more than 50 years showing excellent DC deterioration property. Insulator sample Nos. I22-I29 wherein the porcelains have a specific resistivity $\rho_p$ of $1.0 \times 10^{14}$ Ω·cm $\leq \rho_p \leq 1.0 \times 10^{16}$ Ω·cm and the glazes have a specific resistivity $\rho_g$ of $\rho_g < \rho_p$ have high power frequency puncture voltage in oil. Insulator sample Nos. I22-I27 wherein the porcelains have a specific resistivity $\rho_p$ of $1.0 \times 10^{14}$ Ω·cm $\leq \rho_p \leq 1.0 \times 10^{16}$ Ω·cm and the glazes have a specific resistivity $\rho_g$ of $5.0 \times 10^{12}$ Ω·cm $\leq \rho_g \leq 5.0 \times 10^{14}$ Ω·cm and $\rho_g < \rho_p$ have small rate specific resistivity $\rho_p$ of $1.0 \times 10^{14}$ Ω·cm $\leq \rho_p \leq 1.0 \times 10^{16}$ Ω·cm are combined with glazes having a specific resistivity $\rho_g$ of $1.0 \times 10^{13}$ Ω·cm $\leq \rho_g \leq 5.0 \times 10^{14}$ Ω·cm and $\rho_g < 0.8 \times \rho_p$ have superior properties in the ion accumulation test and excellent heat-resistive property in the temperature cycle test, so that they are particularly preferably as DC high voltage porcelain insulators.

EXAMPLE 3

Porcelain sample No. P4 of the recipe as shown in Table 5 are prepared in the same way as in Example 1 for producing post insulators as shown in FIG. 3 having a total length of 140 mm, porcelain thickness between hardwares of 44 mm and a diameter of holes for the hardwares of 60 mm. Also, disc type suspension insulators are prepared according to U.S. standard, ANSI Class 52-5, are prepared. The porcelains are glazed with glaze No. G6 or No. G13 of recipes as shown in Table 6 such that the glaze has a thickness of 0.20-0.40 mm after firing, the glazes being applied on the porcelains in combinations as shown in the following Table 9 at different portions of the porcelains e.g. at three glaze portions i.e. a glaze portion 2a which contacts with cement 3a, a glaze portion 2b which is exposed to exterior and a glaze portion 2c which contacts with another cement 3b, as shown in FIG. 3. The resultant porcelains having different portions of glazes are fired, bonded to the hardwares with the aid of cement to produce insulator sample Nos. I32-I38 as shown in Table 9. Among these samples, insulator Nos. I32-I36 are post insulators as shown in FIG. 3, wherein Nos. I32-I35 are post insulators composed of the porcelains and the glazes according to the present invention, and No. I36 is prepared as a referential sample for comparison. Insulator sample Nos. I37 and I38 are disc type suspension insulators of the present invention.

Ion accumulation test is performed on these porcelain insulators, using the hardware 4a or 4b as a positive electrode, to compare the deterioration property due to energization of DC voltage. The results are shown also in Table 9. Ion accumulation test is effected at an ambient temperature of 220° C. and an application voltage of DC 10 kv per one porcelain insulator. When the porcelain insulators are not punctured at the amount of the accumulated charge which corresponds to 50 years, the energization of the porcelain insulators is interrupted and power frequency puncture voltage in oil is measured.

TABLE 9

| | | Sample of the present invention | | | | | | | |
|---|---|---|---|---|---|---|---|---|---|
| Sample No. | | I32 | | I33 | | I34 | | I35 | |
| Porcelain sample No. | | \multicolumn{8}{c}{P4} | | | | | | | |
| Specific resistivity of porcelain $\rho_p$ ($\Omega \cdot$ cm) 25° C. | | \multicolumn{8}{c}{$3.2 \times 10^{14}$} | | | | | | | |
| Glaze | | | | | | | | | |
| Portion 2a at hardware 4a | Sample No. | G6 | | G6 | | G6 | | G13 | |
| Specific resistivity $\rho_g$ ($\Omega \cdot$ cm) 25° C. | | $4.1 \times 10^{13}$ | | $4.1 \times 10^{13}$ | | $4.1 \times 10^{13}$ | | $4.7 \times 10^{14}$ | |
| Externally exposed portion 2b | Sample No. | G6 | | G13 | | G13 | | G13 | |
| Specific resistivity $\rho_g$ ($\Omega \cdot$ cm) 25° C. | | $4.1 \times 10^{13}$ | | $4.7 \times 10^{14}$ | | $4.7 \times 10^{14}$ | | $4.7 \times 10^{14}$ | |
| Portion 2c at hardware 4b | Sample No. | G6 | | G6 | | G13 | | G6 | |
| Specific resistivity $\rho_g$ ($\Omega \cdot$ cm) 25° C. | | $4.1 \times 10^{13}$ | | $4.1 \times 10^{13}$ | | $4.7 \times 10^{14}$ | | $4.1 \times 10^{13}$ | |
| Insulator | | | | | | | | | |
| Resistance value R ($\Omega$) 25° C. | | $2.1 \times 10^{13}$ | | $2.3 \times 10^{13}$ | | $2.2 \times 10^{13}$ | | $2.3 \times 10^{13}$ | |
| Temperature coefficient of resistance value K | | 9,580 | | 9,590 | | 9,590 | | 9,570 | |
| Temperature difference in temperature cycle test (°C.) | | >90 | | >90 | | >90 | | >90 | |
| Power frequency puncture voltage in oil (kv) | | 282 | | 282 | | 283 | | 273 | |
| Ion accumulation test | | | | | | | | | |
| Polarity of hardware 4a | | positive | negative | positive | negative | positive | negative | positive | negative |
| Amount of electric charge corresponding to 50 years $C_0$ (coulomb) | | 22 | | 20 | | 21 | | 20 | |
| Amount of electric charge until breakdown $C_1$ (coulomb) | | >22 | >22 | >20 | >20 | >21 | >17 | >17 | >20 |
| Estimated life (years) | | >50 | >50 | >50 | >50 | >50 | >40 | >40 | >50 |
| Power frequency puncture voltage in oil after ion accumulation test (kv) | | 281 | 280 | 286 | 287 | 281 | X | X | 271 |
| Rate of decrease (%) | | 0.4 | 0.7 | 0.7 | 0.3 | 0.7 | X | X | 0.7 |

| | Referential sample | Sample of the present invention | |
|---|---|---|---|
| Sample No. | I36 | I37 | I38 |
| Porcelain sample No. | P4 | P4 | |
| Specific resistivity of porcelain $\rho_p$ ($\Omega \cdot$ cm) 25 ° C. | $3.2 \times 10^{14}$ | $3.2 \times 10^{14}$ | |
| Glaze | | | |
| Portion 2a at hardware 4a    Sample No. | G13 | G6 | G6 |
| Specific resistivity $\rho_g$ ($\Omega \cdot$ cm) 25° C. | $4.7 \times 10^{14}$ | $4.1 \times 10^{13}$ | $4.1 \times 10^{13}$ |
| Externally exposed portion 2b    Sample No. | G13 | G6 | G13 |
| Specific resistivity $\rho_g$ ($\Omega \cdot$ cm) 25° C. | $4.7 \times 10^{14}$ | $4.1 \times 10^{13}$ | $4.7 \times 10^{14}$ |
| Portion 2c at hardware 4b    Sample No. | G13 | G6 | G6 |
| Specific resistivity $\rho_g$ ($\Omega \cdot$ cm) 25° C. | $4.7 \times 10^{14}$ | $4.1 \times 10^{13}$ | $4.1 \times 10^{13}$ |
| Insulator | | | |
| Resistance value R ($\Omega$) 25° C. | $2.2 \times 10^{13}$ | $5.7 \times 10^{12}$ | $5.8 \times 10^{12}$ |
| Temperature coefficient of resistance value K | 9,570 | 9,570 | 9,580 |
| Temperature difference in temperature cycle test (°C.) | >90 | >90 | >90 |
| Power frequency puncture voltage in oil (kv) | 254 | 274 | 272 |
| Ion accumulation test | | | |
| Polarity of hardware 4a | positive    negative | positive    negative | positive    negative |
| Amount of electric charge corresponding to 50 years $C_0$ (coulomb) | 21 | 29 | 29 |
| Amount of electric charge until breakdown $C_1$ (coulomb) | 16    17 | >29    >29 | >29    >29 |

TABLE 9-continued

| | | | | | | |
|---|---|---|---|---|---|---|
| Estimated life (years) | 38 | 40 | >50 | >50 | >50 | >50 |
| Power frequency puncture voltage in oil after ion accumulation test (kv) | X | X | 273 | 272 | 270 | 271 |
| Rate of decrease (%) | X | X | 0.4 | 0.7 | 0.7 | 0.4 |

From the results as shown in the above Table 9, it can be seen that it is sufficient to apply the glaze having a lower specific resistivity than that of the porcelain on the portion 2a which contacts with cement at the side of the hardware 4a which forms a positive electrode, and that the glaze can be applied on the entire surface of the porcelain of the insulator including the both glaze portions 2a and 2c which contact with cements and externally exposed glaze portion 2b. The externally exposed glaze portion 2b can be a cheap usual glaze, because it has no relation to dielectric breakdown due to DC high voltage.

Though the porcelain insulator of the present invention has been explained with reference to the porcelain insulators for DC high voltage use, the porcelain insulator of the present invention is of course usable also for AC high voltage use, because porcelain insulators for AC high voltage use have smaller rate of deterioration as compared with porcelain insulators for DC high voltage use.

As explained above, by defining the specific resistivity $\rho_p$ of the porcelain to $\rho_p \geq 5.0 \times 10^{13}$ Ω·cm and adjusting the chemical composition of the glaze so that the glaze has a lower specific resistivity smaller than the porcelain specific resistivity $\rho_p$, the porcelain insulator of the present invention achieves and retains necessary levels of electrical properties and mechanical properties as a high voltage porcelain insulator and usable with high stability and reliability for a long period of time without deteriorating under energization of high DC or AC voltage, so that it is eminently useful industrially.

Although the present invention has been explained in detail with specific values and embodiments, it will of course be apparent to those skilled in the art that many variations and modifications are possible without departing from the broad aspect and scope of the present invention as defined in the appended claims.

What is claimed is:

1. A high voltage porcelain insulator, comprising a porcelain body, and a glaze applied on at least a surface of the porcelain body, wherein said porcelain body has a specific resistivity $\rho_p$ of $\rho_p \geq 5.0 \times 10^{13}$ Ω·cm, and said glaze has a specific resistivity $\rho_g$ of $\rho_g < \rho_p$.

2. A high voltage porcelain insulator as defined in claim 1, wherein said porcelain body has a specific resistivity $\rho_p$ of $1.0 \times 10^{14}$ Ω·cm $\leq \rho_p \leq 1.0 \times 10^{16}$ Ω·cm, and said glaze has a specific resistivity $\rho_g$ of $5.0 \times 10^{12}$ Ω·cm $\leq \rho_g \leq 5.0 \times 10^{14}$ Ω·cm and $\rho_g < \rho_p$.

3. A high voltage porcelain insulator as defined in claim 1, wherein said porcelain body has a specific resistivity $\rho_p$ of $\rho_p \geq 5.0 \times 10^{13}$ Ω·cm, and said glaze has a specific resistivity $\rho_g$ of $\rho_g \geq 1 \times 10^{13}$ Ω·cm and $\rho_g < 0.8 \rho_p$.

4. A high voltage procelain insulator as defined in claim 1, wherein said porcelain body has a specific resistivity $\rho_p$ of $1.0 \times 10^{14}$ Ω·cm $\leq \rho_p \leq 1.0 \times 10^{16}$ Ω·cm, and said glaze has a specific resistivity $\rho_g$ of $\rho_g \geq 1 \times 10^{13}$ Ω·cm and $\rho_g < 0.8 \rho_p$.

* * * * *